United States Patent
Okamura

(10) Patent No.: US 9,588,612 B2
(45) Date of Patent: Mar. 7, 2017

(54) DISPLAY DRIVE CIRCUIT

(71) Applicant: Synaptics Japan GK, Tokyo (JP)

(72) Inventor: Kazuhiro Okamura, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 23 days.

(21) Appl. No.: 14/638,849

(22) Filed: Mar. 4, 2015

(65) Prior Publication Data

US 2015/0268777 A1    Sep. 24, 2015

(30) Foreign Application Priority Data

Mar. 20, 2014   (JP) ................................. 2014-057976

(51) Int. Cl.
*G06F 3/041*   (2006.01)
*G09G 3/36*    (2006.01)

(52) U.S. Cl.
CPC .......... *G06F 3/0412* (2013.01); *G06F 3/0416* (2013.01); *G09G 3/3677* (2013.01); *G09G 3/3648* (2013.01); *G09G 2310/0264* (2013.01); *G09G 2310/0289* (2013.01); *G09G 2310/08* (2013.01); *G09G 2320/0233* (2013.01); *G09G 2354/00* (2013.01)

(58) Field of Classification Search
CPC ... G06F 3/0412; G06F 3/0416; G09G 3/0416; G09G 3/2011; G09G 3/2014; G09G 3/2018; G09G 3/3648; G09G 3/3677; G09G 2310/0264; G09G 2310/0289; G09G 2310/08; G09G 2320/0233; G09G 2354/00
See application file for complete search history.

(56) References Cited

U.S. PATENT DOCUMENTS

| | | | | |
|---|---|---|---|---|
| 5,684,505 A * | 11/1997 | Takita | ................... | G06F 3/0412 345/104 |
| 5,726,677 A * | 3/1998 | Imamura | .............. | G09G 3/3622 345/537 |
| 5,900,856 A * | 5/1999 | Iino | ....................... | G09G 3/3611 345/100 |
| 6,307,532 B1 * | 10/2001 | Aoki | .................... | G09G 3/3648 345/100 |
| 2002/0011994 A1 * | 1/2002 | Imamura | .............. | G09G 3/3622 345/204 |
| 2002/0024486 A1 * | 2/2002 | Aoki | .................... | G09G 3/3648 345/87 |
| 2003/0034948 A1 * | 2/2003 | Imamura | .............. | G09G 3/3622 345/98 |
| 2007/0080905 A1 * | 4/2007 | Takahara | ............. | G09G 3/3233 345/76 |

(Continued)

*Primary Examiner* — Michael J Eurice
(74) *Attorney, Agent, or Firm* — Patterson + Sheridan, LLP

(57) ABSTRACT

Provided is a display drive circuit which is connected to a display panel including a gate drive circuit that scans gate electrodes, a source driver that drives source electrodes of the display panel, and a gate control driver that supplies a clock signal to the gate drive circuit. The display drive circuit performs an intermittent operation which is alternately provided with a display period in which the source electrodes are driven and an interruption period during which the display panel is not updated. During a start of the display period following the interruption period, the gate control driver extends a pulse width of the clock signal which is supplied to the gate drive circuit, or preliminarily outputs the clock signal before the start of the display period.

20 Claims, 11 Drawing Sheets

(56) References Cited

U.S. PATENT DOCUMENTS

| | | | |
|---|---|---|---|
| 2012/0056835 A1* | 3/2012 | Choo | G06F 3/0412 345/173 |
| 2012/0287081 A1* | 11/2012 | Akai | G06F 3/044 345/174 |
| 2013/0082977 A1* | 4/2013 | Noguchi | G06F 3/0412 345/174 |
| 2013/0241814 A1* | 9/2013 | Hirabayashi | G09G 3/3677 345/100 |

* cited by examiner

DISPLAY DRIVE CIRCUIT

CROSS-REFERENCE TO RELATED APPLICATIONS

The Present application claims priority to Japanese application JP 2014-057976 filed on Mar. 20, 2014, the content of which is hereby incorporated by reference into this application.

BACKGROUND

The invention relates to a display drive circuit, and particularly relates to a technique capable of being suitably used in a display drive circuit that temporarily interrupts and restarts scanning for display drive.

Hitherto, on-cell types of devices where a display panel and a touch panel are independent of each other have been the mainstream. However, in recent years, in-cell types of devices capable of achieving a further reduction in thickness in which a display panel and a touch panel are integrated with each other have been widespread, particularly, in mobile panel modules. A display driver and a touch panel controller are connected to a display panel including a touch sensor, image data which is input from a host processor is displayed, and a touched position is detected and is output to the host processor. In case that display drive is performed simultaneously during the application of a signal to the touch panel for the purpose of a touch detection operation, the signal which is applied for touch detection is mixed into a signal for display, which may result in a deterioration in image quality. Therefore, a time-division operation for temporarily stopping display drive in a period in which the touch detection is performed is proposed.

JP-A-2013-190719 discloses a technique for suppressing a deterioration in image quality in a display device that performs intermittent line sequential scanning by repeating interruption and restart. The display device disclosed in the above document includes a display unit and a scanning unit, and the scanning unit is configured to generate each scanning signal so that transition times on the scanning line terminal side become equal to each other.

SUMMARY

One embodiment described herein is a display drive circuit connected to a display panel including a plurality of source electrodes, a plurality of gate electrodes, and a gate drive circuit that scans the plurality of gate electrodes. The display driver circuit includes a source driver configured to drive the plurality of source electrodes and a gate control driver configured to supply a clock signal to the gate drive circuit. Moreover, the source driver is configured to drive the plurality of source electrodes during a display drive period and stop updating the display panel using the plurality of source electrodes during an interruption period. Further, the display driver period and the interruption period are alternately performed. The gate control driver is configured to output a gate pulse change period during which a pulse width of the clock signal is extended during a start of the display drive period after the interruption period relative to the pulse width of the clock signal during a later portion of the display drive period.

Another embodiment described herein is a display drive circuit connected to a display panel including a plurality of source electrodes, a plurality of gate electrodes, and a gate drive circuit that scans the plurality of gate electrodes. The display drive circuit includes a source driver configured to drive the plurality of source electrodes and a gate control driver configured to supply a clock signal to the gate drive circuit. The source driver is configured to drive the plurality of source electrodes during a display drive period and stop updating the display panel using the plurality of source electrodes during an interruption period. Moreover, the display driver period and the interruption period are alternately performed. The gate control driver is configured to output the clock signal before the interruption period is terminated during a gate pulse change period, and where the gate pulse change period extends at least until the display drive period subsequent to the interruption period is started.

Another embodiment described herein is a display drive circuit connected to a display panel including a plurality of source electrodes, a plurality of gate electrodes, and a gate drive circuit that scans the plurality of gate electrodes. The display drive circuit includes a source driver configured to drive the plurality of source electrodes and a gate control driver configured to supply a clock signal to the gate drive circuit. The source driver is configured to drive the plurality of source electrodes during a display drive period and stop updating the display panel using the plurality of source electrodes during an interruption period when touch detection is performed. Moreover, the display driver period and the interruption period are sequential time periods. The gate control driver is configured to increase a pulse width of the clock signal during a start of the display drive period relative to the pulse width of the clock signal during a later portion of the display drive period.

DETAILED DESCRIPTION

Figure 1:
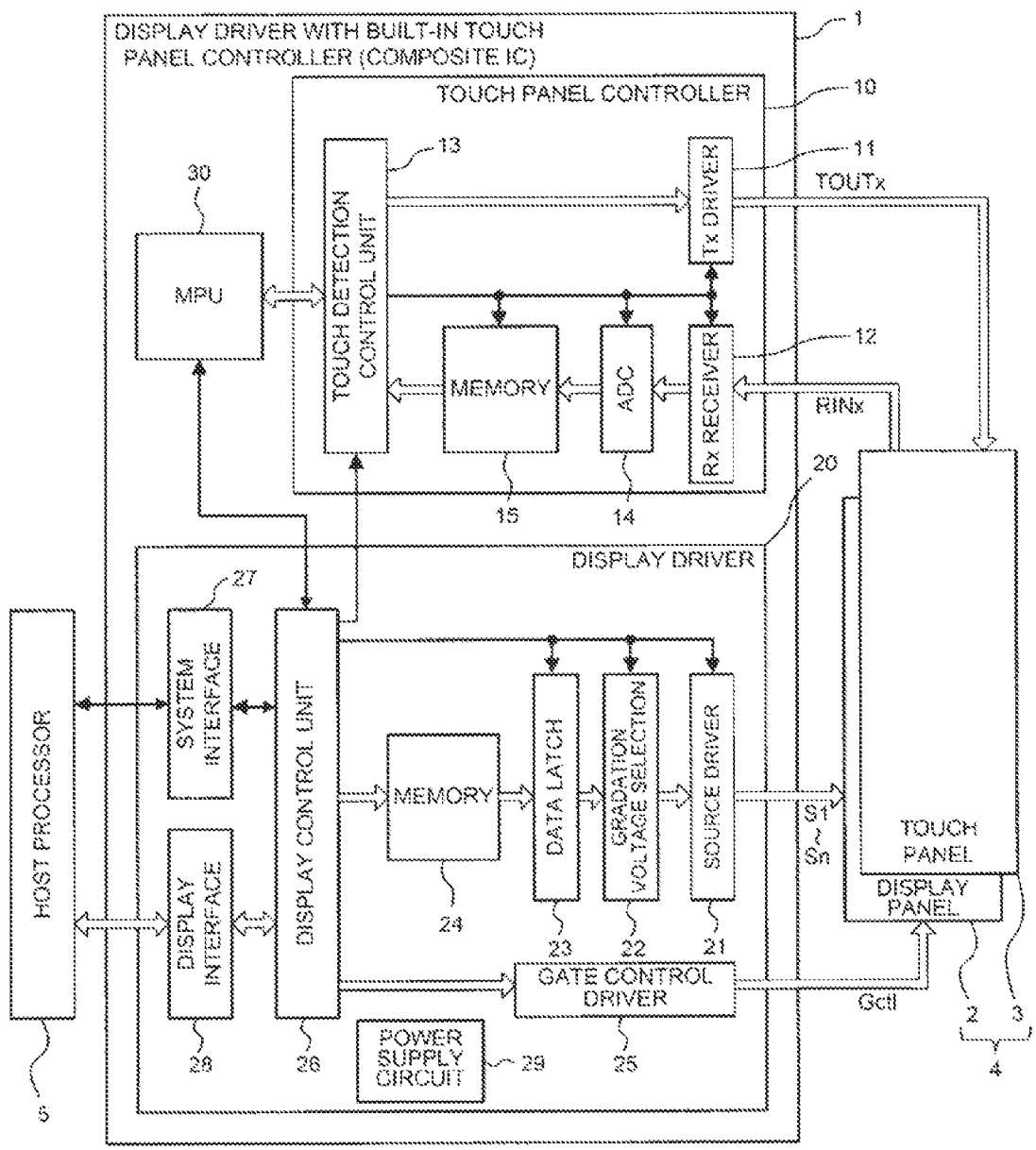
FIG. 1 is a block diagram illustrating a configuration example of a display driver with a built-in touch panel controller (composite IC) of the invention.

The scanning unit of the display device disclosed in JP-A-2013-190719 includes a shift register which is constituted by a dynamic circuit. A potential of an internal node of a transfer circuit constituting a shift register drops due to leakage in a period of interruption associated with an intermittent operation of the scanning unit. A first embodiment of JP-A-2013-190719 discloses a technique for solving the above problem by providing the transfer circuit in which a drop in the potential of the internal node as described above is generated, as a transfer circuit 60 that does not drive a scanning line, separately from another transfer circuit 50 that drives the scanning line. Further, a second embodiment of the above document discloses a technique for solving the above problem by increasing the amplitude of an initial pulse of a clock signal during restart from an interruption period, instead of providing the special transfer circuit 60 that does not drive the scanning line as described above (paragraph 0140 to paragraph 0150).

The technique disclosed in the first embodiment of JP-A-2013-190719 has a problem of lack in the degree of freedom of a design because the transfer circuit (transfer circuit 60 in the above document) that does not drive the scanning line is required to be inserted in the middle of the shift register, and the interruption of the intermittent operation is allowed only at the position thereof. On the other hand, the technique disclosed in the second embodiment of the above document has a problem in that, although there is no problem of the degree of freedom of a design regarding the interruption period in the intermittent operation, but a clock pulse having a large amplitude is applied, whereby the amplitude is limited by a maximum voltage of a transistor constituting the shift register. Particularly, as disclosed in FIGS. 9 and 10 and the like of the above document, a boost in voltage due to a bootstrap operation is performed in the transfer circuit, and thus there is a high possibility of a problem of a maximum voltage occurring in an element which is connected to a boosted node. Particularly, since a bootstrap operation for adding the voltage dropped due to leakage to the amplitude of a clock pulse after restart is performed in the transfer circuit shown in FIG. 9, the boosted voltage after the bootstrap operation is also dependent on to what extent the voltage drops due to leakage. Since a drop in voltage due to leakage fluctuates greatly depending on not only manufacturing variations but also operating conditions, it can be understood that a sufficient margin is required to be provided in order to implement a design so that the boosted voltage after the bootstrap operation does not exceed the maximum voltage. In addition, in case that a design is implemented so as to provide a sufficient margin, the boosted voltage after the bootstrap operation is not able to be increased sufficiently, and thus there is a concern of that deterioration in image quality may not be suppressed sufficiently.

An object of the invention is to suppress a deterioration in image quality due to reduced luminance in an initial scanning line which is restarted after interruption in a display device that performs an intermittent operation for interrupting display drive in the middle of one display frame.

Means for solving such a problem will be described below, but other problems and novel features will be apparent from the following description and accompanying drawings of the specification.

According to an embodiment, the following configuration is formed.

That is, provided is a display drive circuit which is connected to a display panel including a gate drive circuit that scans gate electrodes, and which is provided with a source driver that drives source electrodes of the display panel and a gate control driver that supplies a clock signal to the gate drive circuit. The display drive circuit performs an intermittent operation which is alternately provided with a display drive period in which the source electrodes are driven and an interruption period in which the drive thereof is stopped. During a start of the display drive period after the interruption period, the gate control driver extends a pulse width of the clock signal which is supplied to the gate drive circuit, or preliminarily supplies the clock signal before the start of the display drive period.

A brief description of an effect obtained by the embodiment is as follows.

That is, it is possible to suppress a deterioration in image quality due to reduced luminance in an initial scanning line which is restarted from interruption, in a display device that performs an intermittent operation for interrupting display drive in the middle of one display frame.

1. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Extension of Pulse Width

According to a representative embodiment disclosed in the present application, there is provided a display drive circuit (20) which is connected to a display panel (2) including a plurality of source electrodes (S1 to Sn), a plurality of gate electrodes (G1 to Gm), and a gate drive circuit (80) that scans the plurality of gate electrodes, and is configured as follows.

The display drive circuit (20) includes a source driver (21) that drives the plurality of source electrodes (S1 to Sn) and a gate control driver (25) that supplies a clock signal to the gate drive circuit. A display drive period in which the plurality of source electrodes are driven and an interruption period in which the drive thereof is stopped are alternately included, and the gate control driver has a gate pulse change period in which a pulse width of the clock signal is extended during a start of the display drive period after the interruption period.

Thereby, it is possible to suppress a deterioration in image quality due to reduced luminance in an initial scanning line which is restarted from interruption, in a display device that performs an intermittent operation for interrupting display drive in the middle of one display frame.

Particularly, a special control circuit is not required to be added to the gate drive circuit (80) on the display panel (2) side.

[2] Extension of Pulse Width+Amplitude

In item 1, the gate control driver extends an amplitude of the clock signal which is outputted in the gate pulse change period.

Thereby, it is possible to further effectively suppress a deterioration in image quality.

[3] Register in which Parameter for Specifying Gate Pulse Change Period is Set

In item 2, the display drive circuit further includes a first register, and the gate control driver operates a period, specified on the basis of a parameter which is set by the first register from a time at which the interruption period is terminated, as the gate pulse change period.

Thereby, it is possible to appropriately adjust the gate pulse change period.

[4] Gate Pulse Change Period which is Preliminarily Added in Interruption Period In item 2, the display drive circuit further includes a first register and a second register, and the gate control driver operates a sum of periods, specified on the basis of parameters which are set in the first register and the second register, respectively, as the gate pulse change period. The parameter which is set in the first register specifies a period until the gate pulse change period is terminated from a time at which the interruption period is terminated, and the parameter which is set in the second register specifies a period until the gate pulse change period is started and then the interruption period is terminated.

Thereby, the gate pulse change period is preliminarily started before the termination of the interruption period, and thus the period can be appropriately adjusted by the second register.

[5] Register in which Parameter for Specifying Pulse Width and Amplitude is Set

In item 2, the display drive circuit further includes a third register, and the gate control driver changes one or both of a pulse width and an amplitude of the clock signal which is output in the gate pulse change period, on the basis of a parameter which is set in the third register.

Thereby, it is possible to appropriately adjust the pulse width and the amplitude of the clock signal in the gate pulse change period.

[6] Register in which Parameter for Specifying Pulse Width and Amplitude is Set

In item 5, the display drive circuit further includes a fourth register. The gate control driver changes one or both of the pulse width and the amplitude of the clock signal to be outputted, on the basis of the parameter which is set in the third register, in a portion of a period of the gate pulse change period. The gate control driver changes one or both of the pulse width and the amplitude of the clock signal to be outputted, on the basis of a parameter which is set in the fourth register, in the other portion of the period of the gate pulse change period.

Thereby, it is possible to gradually adjust the pulse width and the amplitude of the clock signal in the gate pulse change period in association with a time.

[7] Preparation Period Before Restart of Display Drive Period

According to a representative embodiment disclosed in the present application, there is provided a display drive circuit (20) which is connected to a display panel (2) including a plurality of source electrodes (S1 to Sn), a plurality of gate electrodes (G1 to Gm), and a gate drive circuit (80) that scans the plurality of gate electrodes, and is configured as follows.

The display drive circuit (20) includes a source driver (21) that drives the plurality of source electrodes (S1 to Sn) and a gate control driver (25) that supplies a clock signal to the gate drive circuit. A display drive period in which the plurality of source electrodes are driven and an interruption period in which the drive thereof is stopped are alternately included, and the gate control driver has a gate pulse change period in which the clock signal is outputted, in a period until the display drive period subsequent to the interruption period is started before the interruption period is terminated.

Thereby, it is possible to suppress a deterioration in image quality due to reduced luminance in an initial scanning line which is restarted from interruption, in a display device that performs an intermittent operation for interrupting display drive in the middle of one frame.

[8] Extension of Clock Amplitude

In item 7, the gate control driver extends an amplitude of the clock signal which is output in the gate pulse change period.

Thereby, it is possible to further effectively suppress a deterioration in image quality.

[9] Extension of Clock Amplitude in Fixed Period after Restart from Preparation Period Before Restart of Display Drive Period In item 8, the gate control driver sets a fixed period after the display drive period is started to the gate pulse change period, in addition to the period until the start of the display drive period subsequent to the interruption period before the termination of the interruption period, and extends the amplitude of the clock signal to be output in the gate pulse change period.

Thereby, it is possible to further effectively suppress a deterioration in image quality.

[10] Gate Pulse Change Period which is Preliminarily Added in Interruption Period In item 9, the display drive circuit further includes a first register and a second register, and the gate control driver operates a sum of periods, specified on the basis of parameters which are set in the first register and the second register, respectively, as the gate pulse change period. The parameter which is set in the first register specifies a period until the gate pulse change period is terminated from a time at which the interruption period is terminated, and the parameter which is set in the second register specifies a period until the gate pulse change period is started and then the interruption period is terminated.

Thereby, the gate pulse change period is preliminarily started before the termination of the interruption period, and thus the period can be appropriately adjusted by the second register.

[11] Register in which Parameter for Specifying Amplitude is Set

In item 8, the display drive circuit further includes a third register, and the gate control driver changes the amplitude of the clock signal to be output in the gate pulse change period, on the basis of a parameter which is set in the third register.

Thereby, it is possible to appropriately adjust the amplitude of the clock signal in the gate pulse change period.

[12] Register in which Parameter for Specifying Pulse Width and Amplitude is Set In item 11, the display drive circuit further includes a fourth register. The gate control driver changes the amplitude of the clock signal to be outputted, on the basis of the parameter which is set in the third register, in a portion of a period of the gate pulse change period. The gate control driver changes the amplitude of the clock signal to be output, on the basis of a parameter which is set in the fourth register, in the other portion of the period of the gate pulse change period.

Thereby, it is possible to gradually adjust the amplitude of the clock signal in the gate pulse change period in association with a time.

2. Further Detailed Description of the Embodiments

Figure 2:
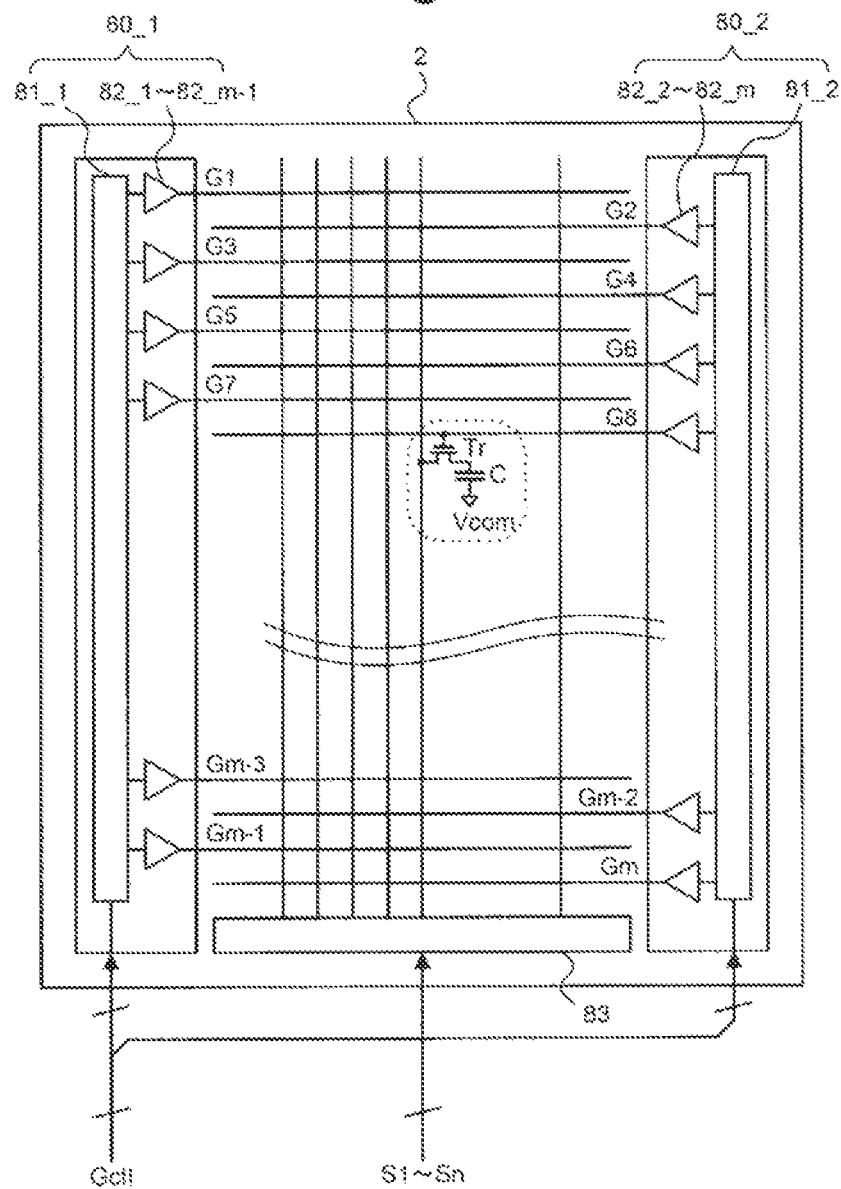
FIG. 2 is a plan view illustrating an electrode configuration of a display panel.

FIG. 1 is a block diagram illustrating a configuration example of a display driver with a built-in touch panel controller (composite IC). FIG. 2 is a plan view illustrating an electrode configuration of a display panel, and FIG. 3 is a plan view illustrating an electrode configuration of a touch panel.

A display driver with a built-in touch panel controller (composite IC) 1 is configured to include a touch panel controller 10, a display driver 20, and a MPU 30, and can be connected to a composite panel 4 composed of a display panel 2 and a touch panel 3, and a host processor 5. Although not particularly limited, the display driver with a built-in touch panel controller (composite IC) 1 is formed on a single semiconductor substrate such as silicon using, for example, a known CMOS (Complementary Metal-Oxide-Semiconductor) semiconductor manufacturing technique. Each of the touch panel controller 10, the display driver 20, and the MPU 30 may be configured by an IC of a separate chip. Further, the display driver 20 may be configured by division into a plurality of ICs such as a plurality of source driver chips and gate control driver chips rather than an IC of one chip.

The configuration of the display panel 2 is illustrated in FIG. 2. The display panel 2 is configured such that gate wirings G1 to Gm as scanning electrodes formed in a transverse direction and source wirings S1 to Sn as signal electrodes formed in a longitudinal direction are disposed, and that a large number of display cells having selection terminals connected to corresponding scanning electrodes and input terminals connected to corresponding signal electrodes are disposed at the intersection portions thereof. As illustrated in a region which is surrounded by a broken line in the drawing, each of the display cells is constituted by a transfer gate Tr of which the gate terminal is connected to a gate wiring and of which the source terminal is connected to a source wiring, and a pixel capacitor C which is formed between the drain terminal of the transfer gate Tr and a common voltage Vcom. The structures of the transfer gates Tr are symmetric with respect to each other, and the relationship between the drain terminal and the source terminal as described above may be reversed. The gate wirings G1 to Gm which are scanning electrodes are sequentially scanned by gate drive circuits 80_1 and 80_2 which are formed on both sides of the display panel 2. The gate drive circuits 80_1 and 80_2 are configured to include shift registers 81_1 and 81_2 and amplifiers 82_1 to 82_$m$ for driving the respective gate wirings G1 to Gm, respectively. A circuit element constituting the gate drive circuits 80_1 and 80_2 is configured using, for example, thin film transistors (TFT) which are formed on a glass substrate of the display panel 2. In this case, the gate drive circuits 80_1 and 80_2 are called a gate-in-panel (GIP). A signal Gct1 for controlling the gate drive circuits 80_1 and 80_2 is supplied from the display driver 20 within the display driver with a built-in touch panel controller (composite IC) 1. A signal having a voltage level corresponding to luminance to be displayed is applied to the source wirings S1 to Sn as signal electrodes from the display driver 20 within the display driver with a built-in touch panel controller (composite IC) 1 directly or through a demultiplexer 83, and the pixel capacitors C of lines selected by the scanning electrodes are charged in parallel. The magnitude of polarization of a liquid crystal is determined depending on the magnitude of an electric field which is formed by charge held by the pixel capacitor C, and the amount of light transmission, that is, the luminance of the pixel is determined. Until the same line is selected in the next frame and charging at a new display level is performed, the pixel capacitor C holds charge and displays the same luminance. Drive of the scanning electrode and the signal electrode as described above in order to transfer charge corresponding to a display level to the pixel capacitor C is called display drive, and a display drive period (also referred to as a display period for short) means a period in which display drive is performed. The configuration of the display panel 2 is arbitrary without being limited to the shown example. For example, instead of including the gate drive circuits, the gate wirings G1 to Gm can also be configured to be directly driven by the display driver 20 within the display driver with a built-in touch panel controller (composite IC) 1.

Figure 3:
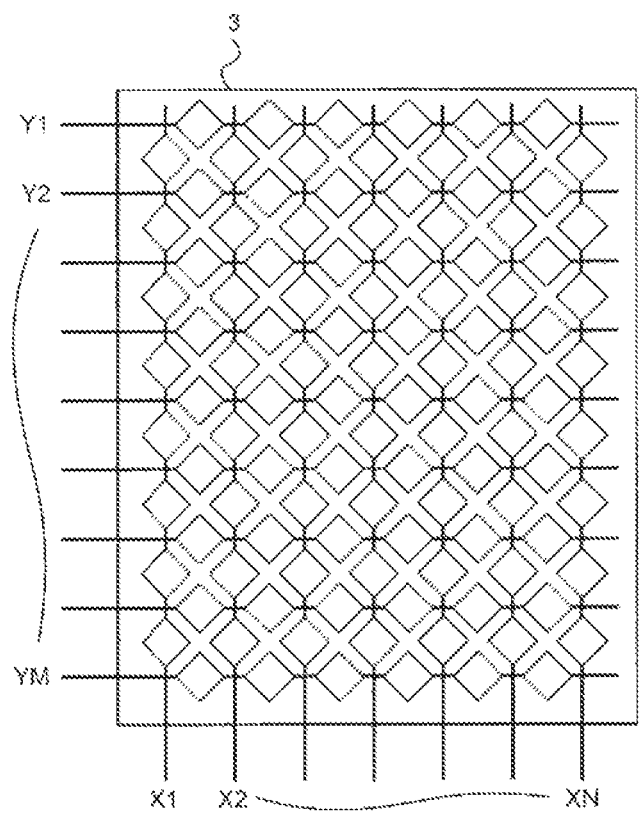
FIG. 3 is a plan view illustrating an electrode configuration of a touch panel.

The electrode configuration of the touch panel 3 is illustrated in FIG. 3. The touch panel 3 is a touch panel of a mutual capacitance type that enables multi-touch detection, and is configured such that a large number of drive electrodes (Y electrodes) Y1 to YM (also denoted as Y electrodes Ym) formed in a transverse direction and a large number of detection electrodes (X electrodes) X1 to XN (also denoted as X electrodes Xn) formed in a longitudinal direction are electrically insulated from each other. Intersection capacitances are formed at the intersecting portions between the X electrodes and the Y electrodes through the capacitance electrode of each electrode. In case that an object such as a finger comes close to the intersection capacitance, a floating capacitance using the object as a capacitance electrode is added to the intersection capacitance. The Y electrodes Y1 to YM are driven by a touch detection drive signal TOUTx being applied, for example, in the arrangement order, from the touch panel controller 10 within the display driver with a built-in touch panel controller (composite IC) 1. Detection data according to a fluctuation in capacitive component at each intersecting portion is obtained on the basis of signals which are sequentially obtained from the X electrodes X1 to XN which are detection electrodes in association therewith. The microprocessor (MPU) 30 controls the drive of the touch panel 3, and performs a process of detecting a touch state or coordinates from the detection data which is acquired by the touch panel controller 10. For example, a digital filter arithmetic operation is performed on the detection data, whereby position coordinates at the intersecting portion having a variation in capacitance are arithmetically calculated on the basis of denoised data. In short, position coordinates in case that a contact event is generated are arithmetically calculated in order to indicate at which position in the intersecting portions the floating capacitance changes, that is, which position in the intersecting portions the finger comes close to (touch is performed, or a contact event is generated). The touch panel 3 is formed using a transmissive (light-transmitting) electrode or a dielectric film, and is disposed so as to overlap, for example, the display surface of the display panel 2. In FIG. 3, the touch panel 3 having electrodes which are rhombic in shape is shown, but the electrodes may have other shapes such as a lattice shape.

Referring back to FIG. 1, the touch panel 3 and the display panel 2 are superimposedly mounted to form the composite panel 4. The composite panel 4 which is a display and touch panel is suitable for a collaborative operation such as, for example, the detection of coordinates subjected to a touch operation, corresponding to an icon displayed on the display panel 2, in the laminated touch panel. A method of laminating the composite panel 4 which is a display and touch panel may be carried out as in an in-cell type of device where integral mounting is performed, and may be carried out as in an integral configuration of a cover glass of an on-cell type of device where the touch panel 3 and a cover glass installed on the upper surface are formed integrally. In addition, in FIG. 1, a signal or a display data signal for controlling a gate wiring for display, and a signal or a detection signal for driving a drive electrode for touch detection are shown by wide arrows, a main control signal or a timing signal for controlling each circuit operation within an IC is shown by a solid line arrow, and a power supply wiring is not shown. In addition, bus display of a signal line is not shown in the drawing, but each signal line is constituted by one or a plurality of analog or digital signal wirings.

The host processor 5 generates display data, and the display driver 20 performs display control for displaying display data received from the host processor 5 on the display panel 2. The host processor 5 acquires data of position coordinates in case that a contact event is generated, from the MPU 30, and analyzes an input based on the operation of the touch panel 3 from a relationship between the data of position coordinates in the display panel 2 and a display screen displayed by giving the data to the display driver 20. Although not particularly limited, a communication control unit, an image processing unit, a sound processing unit, other accelerators, and the like which are not shown, may be built into the host processor 5 or connected thereto, to thereby form, for example, a portable terminal.

The touch panel controller 10 within the display driver with a built-in touch panel controller (composite IC) 1 is configured to include a touch detection signal drive circuit (Tx driver) 11, a touch detection signal detection circuit (Rx receiver) 12, a touch detection control unit 13, an A/D converter (ADC) 14, and a memory 15. The touch detection signal drive circuit (Tx driver) 11 drives the Y electrodes Y1 to YM which are drive electrodes by applying the touch detection drive signal TOUTx, for example, in the arrangement order. A signal RINx sequentially obtained from the X electrodes X1 to XN which are detection electrodes in association therewith is detected and amplified in the Rx receiver 12, converted into a digital value in the ADC 14, and written in the memory 15. The detected digital value is read out in the MPU 30 through the touch detection control unit 13, and the MPU 30 performs a process of detecting a touch state or coordinates from the detection data which is acquired by the touch panel controller 10.

The display driver 20 within the display driver with a built-in touch panel controller (composite IC) 1 is configured to include a system interface 27, a display interface 28, a display control unit 26, a gate control driver 25, a memory 24, a data latch circuit 23, a gradation voltage selection circuit 22, a source driver 21, and a power supply circuit 29. The display driver 20 is connected to the host processor 5 by a system bus through the system interface 27, receives a control command, transmits data including a touch position or a state which is detected by the MPU 30, and transmits and receives various parameters within other ICe. The display driver 20 may be connected to the host processor 5 by an interface based on MIPI-DSI (Mobile Industry Processor Interface Display Serial Interface) which is one of, for example, a standard communication interface that may be used as a display interface 28 to receive image data to be displayed on the display panel 2 at high speed, and also receive timing information such as a vertical synchronizing signal (Vsync) and a horizontal synchronizing signal (Hsync).

The display control unit 26 includes a command register (not shown) and a parameter register (not shown) that hold the control command and the parameters which are received from the host processor 5, and control the operation of each circuit on the basis thereof. In addition, the control command and the parameters which are received from the host processor 5 are transferred to the MPU 30 and the touch panel controller 10, and a relay for transmitting data such as a touch position or a state from the MPU 30 to the host processor 5 is performed.

The display control unit 26 controls the gate control driver 25 on the basis of the timing information such as the vertical synchronizing signal (Vsync) and the horizontal synchronizing signal (Hsync) which are received by the display interface 28, and outputs a control signal Gct1 which is supplied to the gate drive circuits 80_1 and 80_2 of the display panel 2. The signal Gct1 for controlling the gate drive circuits 80_1 and 80_2 is constituted by, for example, a clock G_CLK for a shift operation of the shift registers 81_1 and 81_2, a start flag G_ST which is input to an initial stage, and each signal such as G_UP/G_DN for specifying the direction of a shift and G_EN (enable) for temporarily stopping a shift operation.

The display control unit 26 writes image data which is received by the display interface 28 in the memory 24. The memory 24 is a SRAM (Static Random Access Memory), and functions as a frame memory. One line's worth of image data is read out into the data latch 23 from the memory 24. The gradation voltage selection circuit 22 converts one line's worth of image data supplied from the data latch 23 as a digital value, in parallel, into a corresponding analog gradation voltage and supplies the resultant to the source driver 21. The gradation voltage selection circuit 22 selects and outputs one analog gradation voltage, corresponding to the image data having a digital value, from a multi-gradation analog gradation voltage which is generated and supplied by a gradation voltage generation circuit (not shown), or newly generates an intermediate gradation voltage from a plurality of gradation voltages, and supplies the generated voltage to the source driver 21. The source driver 21 performs current amplification on the input gradation voltage, and drives the signal electrodes (source wirings) S1 to Sn of the display driver 2.

The power supply circuit 29 is configured to include a booster circuit, a step-down circuit, a stabilizing circuit (regulator), and the like, and generates an internal power supply, used in each circuit within the display driver with a built-in touch panel controller (composite IC) 1, from a power supply which is supplied from the outside.

The above-mentioned display driver 20 has been described with respect to a configuration example in which the frame memory 24 is built in, but can also adopt a configuration in which the frame memory is not built in. In the configuration example in which the frame memory 24 is built in, in case that an image to be displayed is a still image, a still image of one frame is held in the frame memory 24, and is repeatedly read out and displayed, whereby it is possible to omit the transfer of image data from the host processor 5 in a period in which the still image is displayed. On the other hand, in the configuration in which the frame memory is not built in, a chip area can be reduced, and thus costs are reduced.

Time division operations of display drive and touch sensing will be described below.

The display driver 20 and the touch panel controller 10 perform a time-division operation by one frame period being divided into a display drive period and a touch sensing period. For example, four display drive periods are provided by dividing one frame into four, and the touch sensing period is provided between each of the display drive periods. In four display drive periods, gate wirings G1 to Gm/4, Gm/4+1 to Gm/2, Gm/2+1 to G3m/4, and G3m/4+1 to Gm are driven, and the source driver 21 drives the source wirings S1 to Sn. In the display drive periods, the touch panel controller 10 stops an output of the touch detection drive signal TOUTx from the touch detection signal drive circuit (Tx driver) 11, and a detection operation of the touch detection signal detection circuit (Rx receiver) 12. In the touch sensing period, the touch panel controller 10 outputs the touch detection drive signal TOUTx from the touch detection signal drive circuit (Tx driver) 11, and performs the detection operation of the touch detection signal detection circuit (Rx receiver) 12, whereas the display driver 20 stops driving the gate wirings and the source wirings.

According to the above-mentioned example, a case is examined in which the gate wirings G1 to Gm/4 are driven in a first display drive period, and the gate wirings Gm/4+1 to Gm/2 are driven in a second display drive period after the elapse of the touch sensing period (interruption period in which display drive is interrupted). JP-A-2013-190719 described above points out that there is a concern of a waveform for driving an initial gate wiring in the display period which is restarted after interruption becoming dull (FIG. 17, paragraph 103 and the like of the above document). Such a phenomenon occurs because the gate drive circuit 80 is a dynamic circuit, and charge stored in an internal capacitor is reduced due to leakage in the interruption period. This is more remarkable in a case where the gate drive circuit 80 is formed on the display panel 2 by a TFT, and is configured using only a MOS of one conductivity type rather than a CMOS, particularly, in order to reduce costs. A shift register circuit (see FIG. 9 of the above document) disclosed in the above document has a capacitance C2 that holds charge in an interruption period, and the capacitance C2 is bootstrapped at a high potential by a clock CK1 being input thereto. The bootstrapped potential drives the gate terminal of a transistor N6 which is an output driver. In this case, as a solution to a problem of a reduction in charge held by the capacitance C2 due to leakage in the interruption period, the amplitude of an initial clock CK1 after restart being increased is shown in a second example (FIG. 32 and paragraph 0141 to paragraph 0143). According to this solution, it is possible to further increase a voltage for driving the gate terminal of the transistor N6 by bootstrapping, and to offset the decrement of the voltage which is decreased due to leakage from the capacitance C2. However, since the manufacturing variation in the magnitude of leakage as well as the manufacturing variation in the capacitance value of the capacitance C2 is extremely great, and the magnitude of leakage fluctuates greatly depending on the environmental temperature during use or the like, it is very difficult to implement an accurate design regarding to which extent a clock voltage to be applied is set. Further, in this case, when the leakage is small and a drop in the voltage of the capacitance C2 is small, a very high voltage is applied to the gate terminal of the transistor N6 by bootstrapping, and thus it is also necessary to consider a problem of a gate withstand voltage. In this manner, even when the configuration of the gate drive circuit 80 is limited to a circuit disclosed in JP-A-2013-190719, it can be understood that there is the above-mentioned problem.

Generally, the display drive circuit 20 or the display driver with a built-in touch panel controller (composite IC) 1 including the circuit is required to be designed with the ability of being connected to various types of display panels 2. In this case, in the circuit configuration of the gate drive circuit 80, various modification examples are considered such as, for example, an inverse rise in voltage in addition to a drop in voltage due to leakage, no use of a bootstrap operation, and the inclusion of a shift register for each display region conforming to a time division operation of display and touch sensing. As described above, a general object of the invention is to suppress a deterioration in image quality due to reduced luminance in an initial scanning line which is restarted after interruption in a display device that performs an intermittent operation for interrupting display drive in the middle of one frame, but a further object thereof is to provide a display drive circuit 20 having a high degree of adaptability or a display driver with a built-in touch panel controller (composite IC) 1 including a circuit which is capable of achieving the aforementioned object in a case of there being various display panels.

Figure 4:
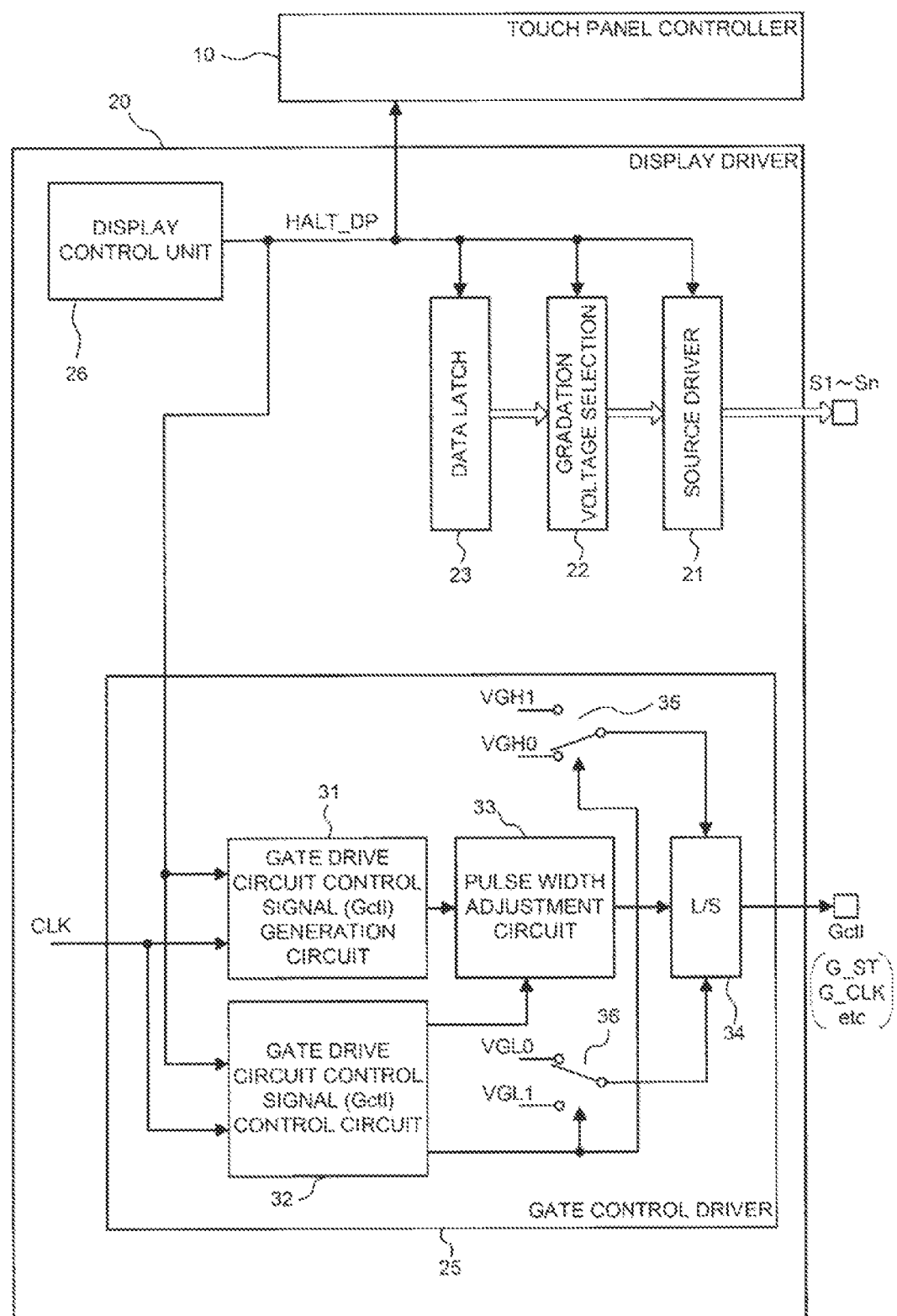
FIG. 4 is a block diagram illustrating a configuration example of a gate control driver of the invention.

FIG. 4 is a block diagram illustrating a configuration example of the gate control driver 25 of the invention. FIG. 4 illustrates the touch panel controller 10 and a portion of the display drive circuit (display driver) 20 including the gate control driver 25. The display driver 20 is configured to include the source driver 21, the gradation voltage selection circuit 22 and the data latch 23 for driving the source electrodes (S1 to Sn) of the display panel 2, the gate control driver 25 for bringing the gate electrodes (G1 to Gm) into operation, and the display control unit 26 that controls these components. A display drive interruption control signal HALT_DP is output from the display control unit 26, and is supplied to the touch panel controller 10, the source driver 21, and the gate control driver 25. Since the display drive interruption control signal HALT_DP is a timing control signal for controlling the time-division operation of display drive and touch sensing, the signal may be controlled synchronously on the basis of the same signal, and the same control signal may be generated at the touch panel controller 10 side and be supplied to the display driver 20. While the touch panel controller 10 performs a touch detection operation, the display driver 20 interrupts display drive.

The gate control driver 25 supplies the control signal Gct1 for bringing the gate drive circuit 80 within the display panel 2 into operation. In accordance with the specification of the display panel 2 capable of being connected, the control signal Gct1 is constituted by each signal such as the clock G_CLK for a shift operation of the shift register constituting the gate drive circuit 80, the start flag G_ST which is input to the initial stage of the shift register, the signal G_UP/GDN for specifying the direction of a shift, and the signal G_EN (enable) for temporarily stopping the shift operation. The gate control driver 25 includes a gate drive circuit control signal (Gct1) generation circuit 31, a gate drive circuit control signal (Gct1) control circuit 32, a pulse width adjustment circuit 33, a level shift circuit (L/S) 34, and power switches 35 and 36.

The gate drive circuit control signal (Gct1) generation circuit 31 outputs a basic waveform of each signal constituting Gct1. For example, the clock G_CLK is a clock which is synchronized with the horizontal synchronizing signal (Hsync), and is selected from forms such as phase 1, non-overlap phase 2, and phase 4. The start flag G_ST is basically a pulse which is synchronized with the vertical synchronizing signal (Vsync), but is changed in accordance with the configuration of the shift register of the display panel 2. In a case of one shift register that sequentially scans the entirety of one frame, the start flag G_ST is configured such that only one pulse is output to one frame similarly to the vertical synchronizing signal (Vsync). In case that a plurality of shift registers are provided by division for each display period for time division display, one pulse is output whenever the display drive period is started. A signal which is synchronized with the display drive interruption control signal HALT_DP is output as G_EN (enable) to the shift register having G_EN (enable) for temporarily stopping the shift operation. In case that G_EN (enable) is disabled, the shift register having shift enable is configured such that shift data is fed back to the present stage without being transferred to the next stage, and an output thereof to the gate wiring is invalidated.

The pulse width adjustment circuit 33 adjusts the pulse width of a basic waveform which is output from the gate drive circuit control signal (Gct1) generation circuit 31 with respect to each signal constituting Gct1, on the basis of control performed by the gate drive circuit control signal (Gct1) control circuit 32. For example, in case that the clock G_CLK is a non-overlap phase 2, the amount of non-overlap is adjusted. Besides, in the invention, the pulse width of a basic waveform is appropriately adjusted during the start of the display drive period after the interruption period. For example, the pulse width of the clock G_CLK is extended, or the pulse width of the start flag G_ST is extended.

The level shift circuit (L/S) 34 is supplied with power supplies on the high potential side and the low potential side, respectively, from the power switches 35 and 36, and adjusts and outputs the amplitude of each signal constituting Gct1 after the pulse width is adjusted by the pulse width adjustment circuit 33. The power switch 35 switches the power supply on the high potential side between normal VGH0 and VGH1 higher than that, and the power switch 36 switches the power supply on the low potential side between normal VGL0 and VGL1 lower than that. Here, the amplitude of the signal constituting Gct1 is appropriately adjusted during the start of the display drive period after the interruption period. For example, the amplitude of the clock G_CLK or the start flag G_ST is extended and output between VGL1 and VGH1 from between normal VGL0 and VGH0.

The adjustment of a pulse width and the extension of an amplitude will be described in detail below.

Figure 5:
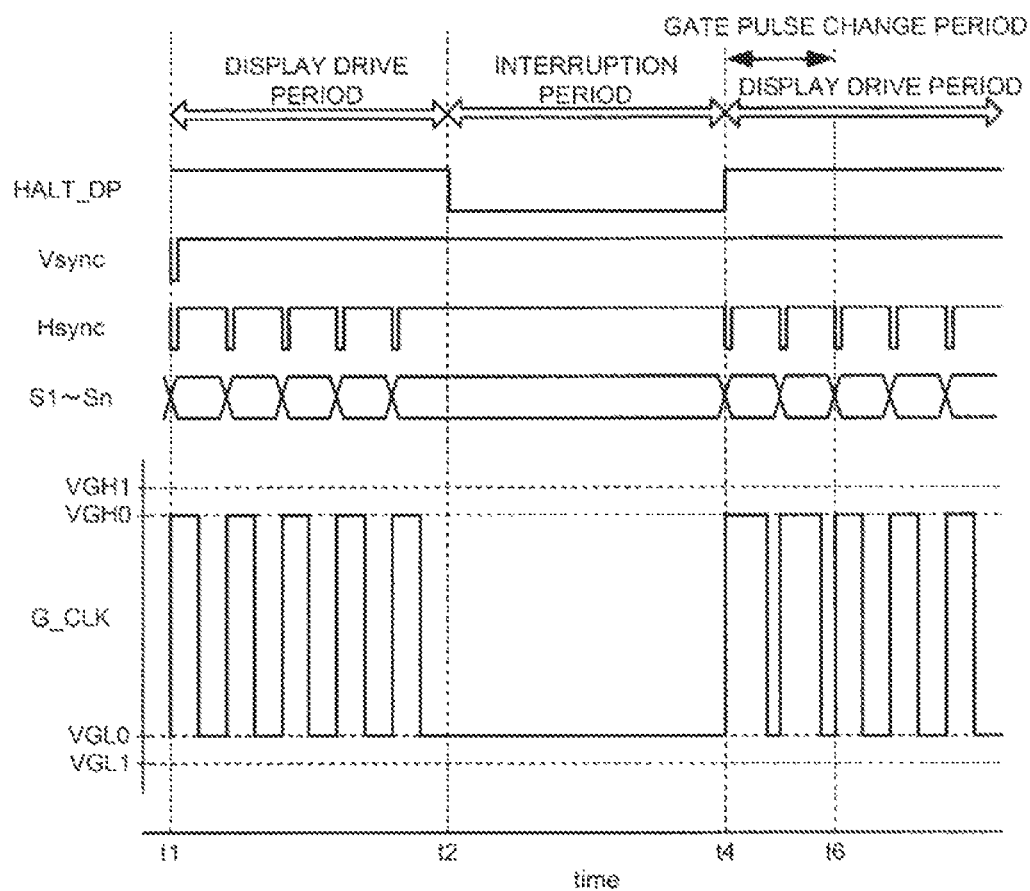
FIG. 5 is a timing diagram illustrating a first operation example of the gate control driver.

FIG. 5 is a timing diagram illustrating a first operation example of the gate control driver 25. The horizontal axis is time and represents the display drive period, the interruption period and the next display drive period, and the vertical axis direction represents the clock G_CLK of the shift register as an example of the display drive interruption control signal HALT_DP, the vertical synchronizing signal Vsync, the horizontal synchronizing signal Hsync, the source line drive signals S1 to Sn, and the gate drive circuit control signal (Gct1) in order from above. The display drive interruption control signal HALT_DP, the vertical synchronizing signal Vsync, and the horizontal synchronizing signal Hsync are represented by logic waveforms of a negative logic without explicitly showing the amplitudes. The source line drive signals S1 to Sn are analog signals individually, but a change for each line in synchronization with the horizontal synchronizing signal Hsync is schematically illustrated. The clock G_CLK is a digital waveform, but the amplitude thereof is also illustrated.

The display drive interruption control signal HALT_DP is high in the display drive period of a period between time t1 and time t2 and a period after time t4, and is low in the interruption period between time t2 and time t4. The vertical synchronizing signal Vsync generates a low pulse at time t1 at which a frame is started, and then is maintained to be high until the next frame which is not shown. The horizontal synchronizing signal Hsync generates a low pulse for each line and the source line drive signals S1 to Sn are output in synchronization therewith in the display drive period. And the horizontal synchronizing signal Hsync is maintained to be high, and the output of the source line drive signals S1 to Sn is stopped in the interruption period.

The above description of FIG. 5 is the same with respect to other timing diagrams shown in FIGS. 6 to 9 and 11 of the present specification, and thus the same description will not be given for these respective drawings.

In an initial display drive period between time t1 and time t2, the clock G_CLK is output at a normal amplitude in a range between VGL0 and VGH0. In case that the clock enters the interruption period at time t2, the output thereof is stopped. Thereafter, in case that the next display drive period is started from time t4, in a gate pulse change period from time t4 to time t6, the clock G_CLK is output with the extension of a high period by the pulse width adjustment circuit 33 thereby changing the duty cycle of the clock G_CLK. After time t6, the clock returns to a normal output or duty cycle similar to the initial display drive period between time t1 and time t2. The gate pulse change period, that is, the period in which the high period is extended (period between time t4 and time t6 in the drawing) can be set by, for example, a register. The horizontal synchronizing signal Hsync is counted from a point in time of the start of the display drive period, and the extension of the pulse width is stopped at a point in time consistent with a value which is set in the register. The signal returns to a normal pulse width. As described above, this is effective in case that the shift register 81 within the gate drive circuit 80 of the display panel 2 is a circuit system in which an internal capacitor is charged with the amount of charge according to the length thereof in the high period of the clock G_CLK. On the other hand, in case that the shift register is a circuit system in which an internal voltage level is recovered according to the length of the low period of the G_CLK, the setting thereof may be performed so that the low width of G_CLK is extended. A register is provided within the gate drive circuit control signal (G_ctl) control circuit 32, and thus the setting thereof can be performed.

Figure 6:
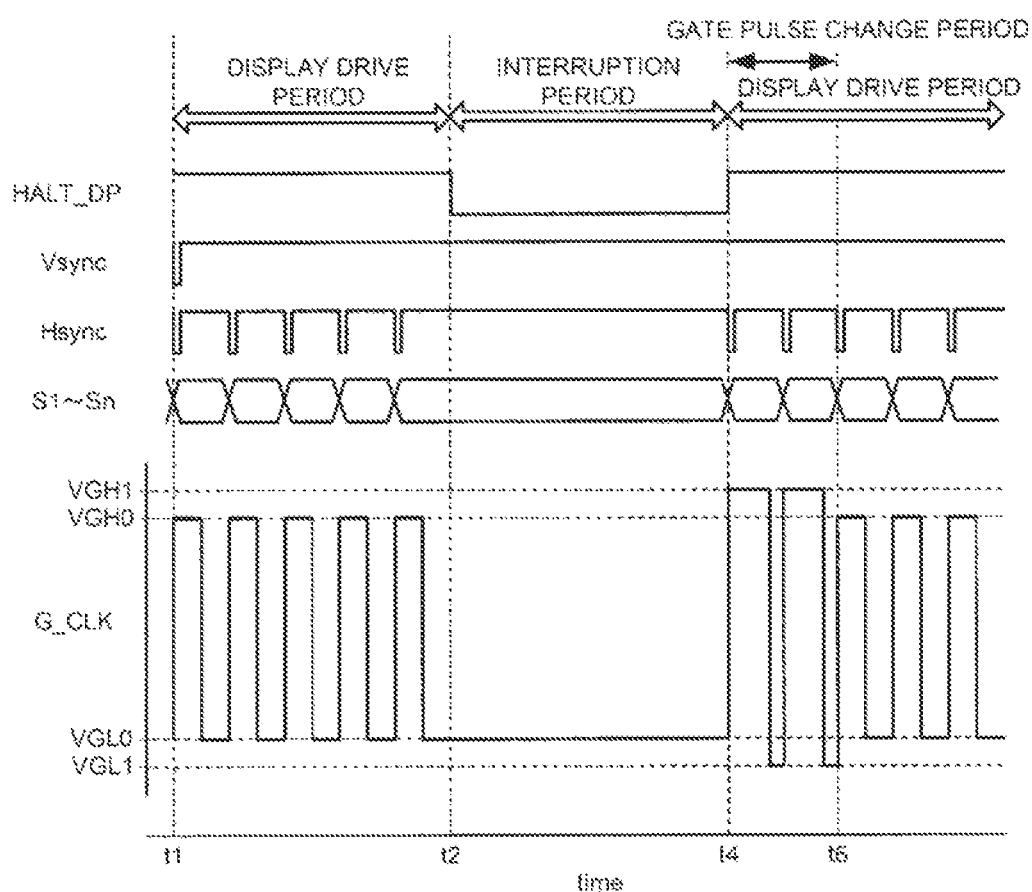
FIG. 6 is a timing diagram illustrating a second operation example of the gate control driver.

FIG. 6 is a timing diagram illustrating a second operation example of the gate control driver 25.

In an initial display drive period between time t1 and time t2, the clock G_CLK is output at a normal amplitude in a range between VGL0 and VGH0. In case that the clock enters the interruption period at time t2, the output thereof is stopped. Thereafter, in case that the next display drive period is started from time t4, in a gate pulse change period from time t4 to time t6, the clock G_CLK is output with the extension of a high period by the pulse width adjustment circuit 33 thereby changing the duty cycle of clock G_CLK. In the gate pulse change period from time t4 to time t6, the amplitude of the clock G_CLK is further changed from the normal amplitude in a range between VGL0 and VGH0 to the extended amplitude in a range between VGL1 and VGH1. After time t6, the clock returns to a normal output or duty cycle similar to the initial display drive period between time t1 and time t2. The gate pulse change period (time t4 to time t6) in which the high period is extended and the amplitude is extended can be set by, for example, a register. The operation example shown in this drawing is different from that shown in FIG. 5, in that not only is the high period extended in the gate pulse change period, but also the amplitude is increased. This is effective in case that the shift register 81 within the gate drive circuit 80 of the display panel 2 is a circuit system in which an internal capacitor is charged with the amount of charge according to the amplitude thereof in addition to the length, in the high period of the clock G_CLK. On the other hand, in case that the shift register is a circuit system in which an internal voltage level is recovered according to the length of the low period of G_CLK and the amplitude in the direction of a negative electrode, the setting thereof may be performed so that the low width of G_CLK is extended and the amplitude in the direction of a negative electrode is extended. A register is provided within the gate drive circuit control signal (G_ctl) control circuit 32, and thus the setting thereof can be performed.

Figure 7:
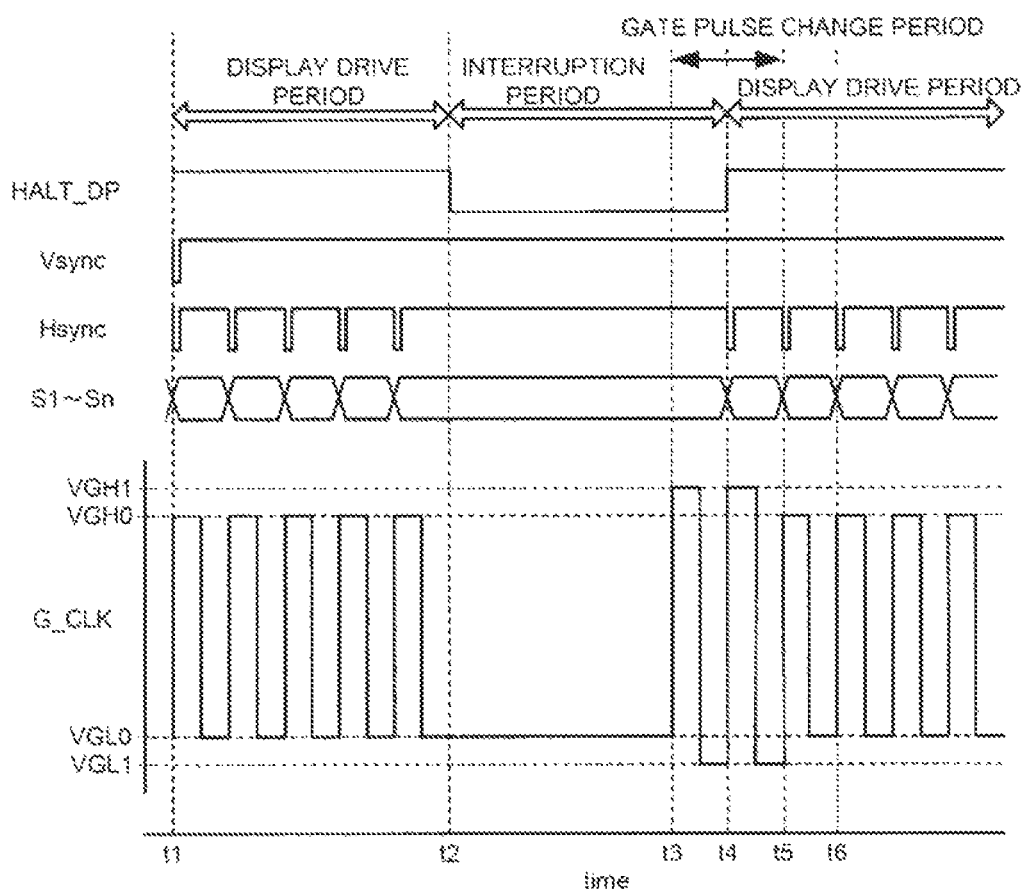
FIG. 7 is a timing diagram illustrating a third operation example of the gate control driver.

FIG. 7 is a timing diagram illustrating a third operation example of the gate control driver 25.

In an initial display drive period between time t1 and time t2, the clock G_CLK is output at a normal amplitude in a range between VGL0 and VGH0. In case that the clock enters the interruption period at time t2, the output thereof is stopped. Thereafter, a period from time t3 to time t5 earlier than that of the above-mentioned first and second operation examples, that is, earlier than the start of the next display drive period becomes the gate pulse change period. In the gate pulse change period from time t3 to t5, the amplitude of the clock G_CLK is changed from the normal amplitude in a range between VGL0 and VGH0 to the extended amplitude in a range between VGL1 and VGH1. After time t5, the clock returns to a normal output similarly to the initial display drive period between time t1 and time t2. The gate pulse change period (time t3 to time t5) in which the amplitude is extended can be set by, for example, a register. A plurality of registers can also be included so that periods before the start of the gate pulse change period and after the start thereof can be specified independently of each other. This is effective in case that the shift register 81 within the gate drive circuit 80 of the display panel 2 is a circuit system in which an internal capacitor is charged with the amount of charge according to the amplitude of the clock G_CLK. Particularly, since the operation of the shift register 81 can be started in a period before the drive of the gate wiring for actual display drive is restarted, it is possible to reliably return an internal node of the shift register 81 to a normal voltage level until the drive of the gate wiring is started, and to stabilize a voltage for driving the gate wiring. In this case, in order not to advance the shift operation of the shift register 81 more than necessary, a transfer circuit that does not drive the gate wiring may be provided within the shift register 81, or the shift operation is disabled by a control signal such as an enable signal. Alternatively, such a realization can be made by providing a corresponding shift register 81 for each display period, and making a timing at which a start flag for the corresponding shift register 81 is supplied appropriately.

Figure 8:
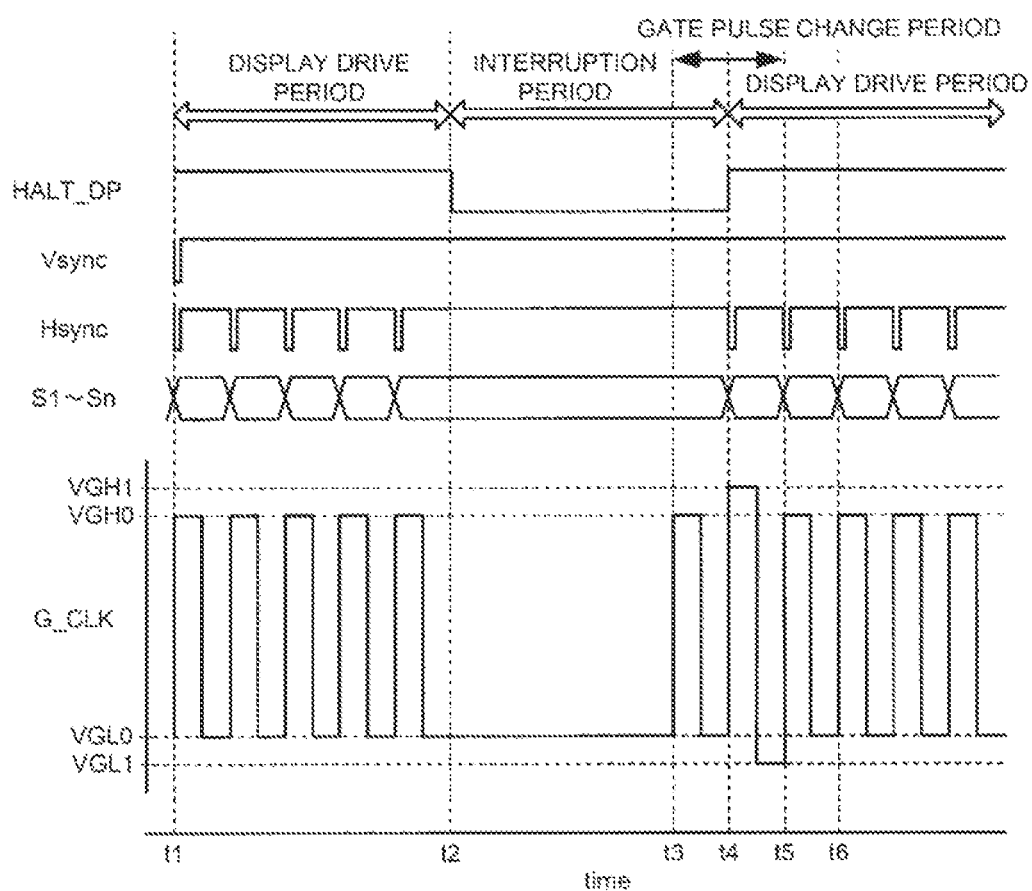
FIG. 8 is a timing diagram illustrating a fourth operation example of the gate control driver.

FIG. 8 is a timing diagram illustrating a fourth operation example of the gate control driver 25.

In an initial display drive period between time t1 and time t2, the clock G_CLK is output at a normal amplitude in a range between VGL0 and VGH0. In case that the clock enters the interruption period at time t2, the output thereof is stopped. Thereafter, a period from time t3 to time t5 earlier than the start of the next display drive period becomes the gate pulse change period similarly to the above-mentioned third operation example. In the first half of the gate pulse change period until time t4 at which the display drive period is started from time t3, the amplitude of the clock G_CLK is a normal amplitude in a range between VGL0 and VGH0. In the second-half period between time t4 and time t5, the amplitude thereof is changed to an extended amplitude in a range between VGL1 and VGH1. After time t5, the clock returns to a normal output similarly to the initial display drive period between time t1 and time t2. A time at which the gate pulse change period is started and a time at which the period is terminated, and a parameter for specifying the amplitude of the clock G_CLK in each period can be set by, for example, a register. Each period and the amplitude are configured so as to be capable of being freely set, and thus it is possible to adapt to various display panels 2.

Figure 9:
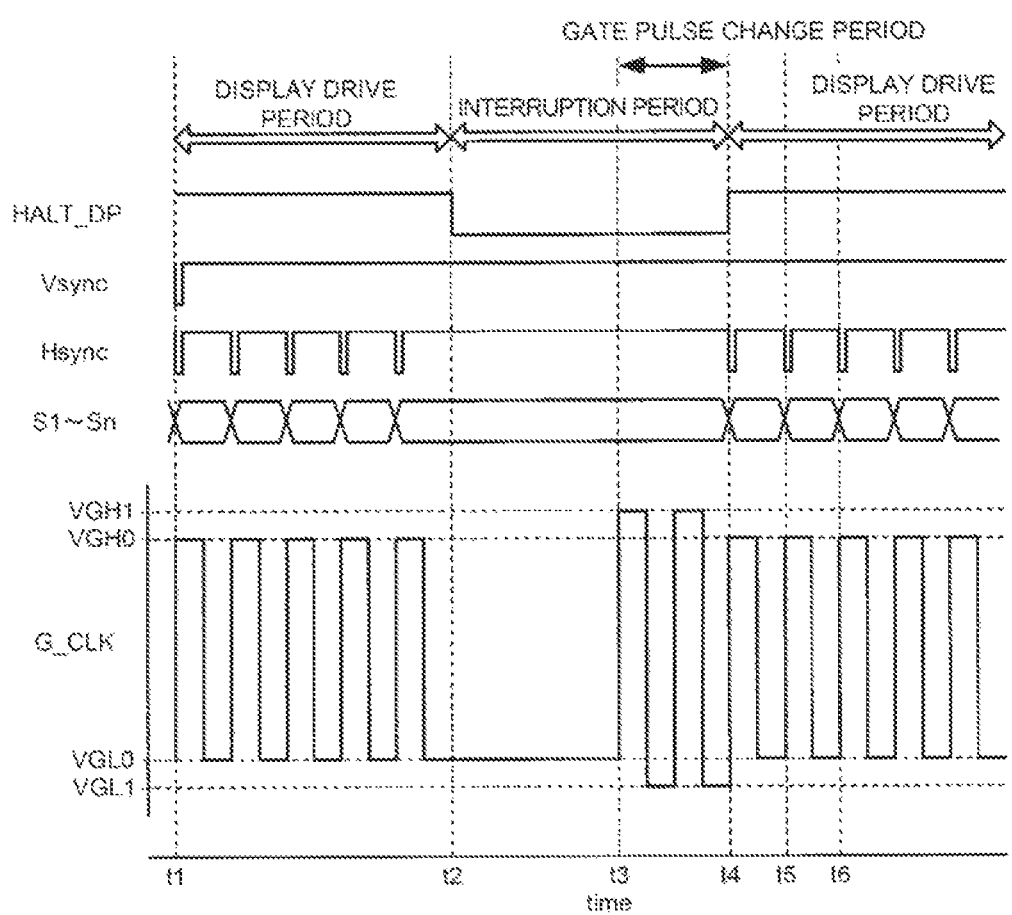
FIG. 9 is a timing diagram illustrating a fifth operation example of the gate control driver.

FIG. 9 is a timing diagram illustrating a fifth operation example of the gate control driver 25.

In an initial display drive period between time t1 and time t2, the clock G_CLK is output at a normal amplitude in a range between VGL0 and VGH0. In case that the clock enters the interruption period at time t2, the output thereof is stopped. Thereafter, similar to the above-mentioned fourth operation example, the gate pulse change period is started from time t3 earlier than the start of the next display drive period, but the gate pulse change period is terminated at time t4 at which the next display drive period is started. FIG. 9 illustrates an example in which the amplitude of the clock G_CLK is extended in the gate pulse change period, but the amplitude may be maintained at a normal amplitude as it is. A time at which the gate pulse change period is started and a time at which the period is terminated, and a parameter for specifying the amplitude of the clock G_CLK in each period can be freely set by, for example, a register.

As described above, the gate drive circuit control signal control circuit 32 shown in FIG. 4 is provided with registers that specify times at which the gate pulse change period is started and terminated, registers that specify the magnitude and/or amplitude of the high width and the low width in each period are provided, and the pulse width adjustment circuit 33 and the switches 35 and 36 are configured so as to be controlled, thereby allowing the display drive circuit 20 having a high degree adaptability or the display driver with a built-in touch panel controller (composite IC) 1 including this circuit to be provided.

Figure 10:
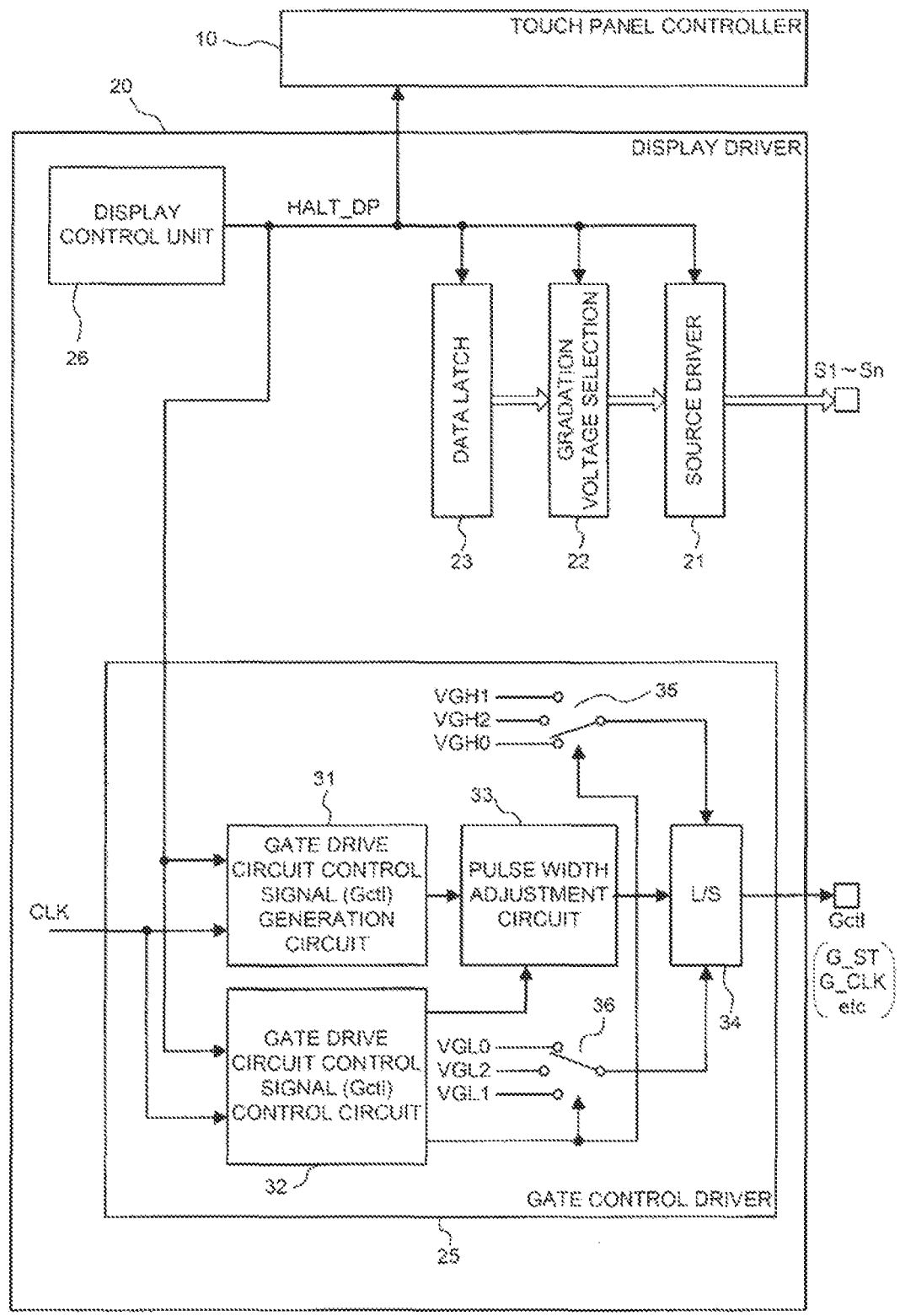
FIG. 10 is a block diagram illustrating a configuration example of a gate control driver in one embodiment.

FIG. 10 is a block diagram illustrating a configuration example of a gate control driver 25 in another embodiment. Similarly to FIG. 4, FIG. 10 illustrates the touch panel controller 10 and a portion of the display drive circuit (display driver) 20 including the gate control driver 25. The gate control driver 25 is configured such that a voltage which is supplied to the level shift circuit (L/S) 34 can be switched to three voltages of VGH2 in addition to the voltages VGH0 and VGH1 by the power switch 35, and can be switched to three voltages of VGL2 in addition to the voltages VGL0 and VGL1 by the power switch 36. Other configurations are the same as those of the embodiment described with reference to FIG. 4, and thus the description thereof will not be given. Switching of the amplitude of the gate drive circuit control signal (Gct1) such as the clock G_CLK is controlled between VGL0 to VGH0 of a normal amplitude, extended amplitudes VGL2 to VGH2, and extended amplitudes VGL1 to VGH1.

Figure 11:
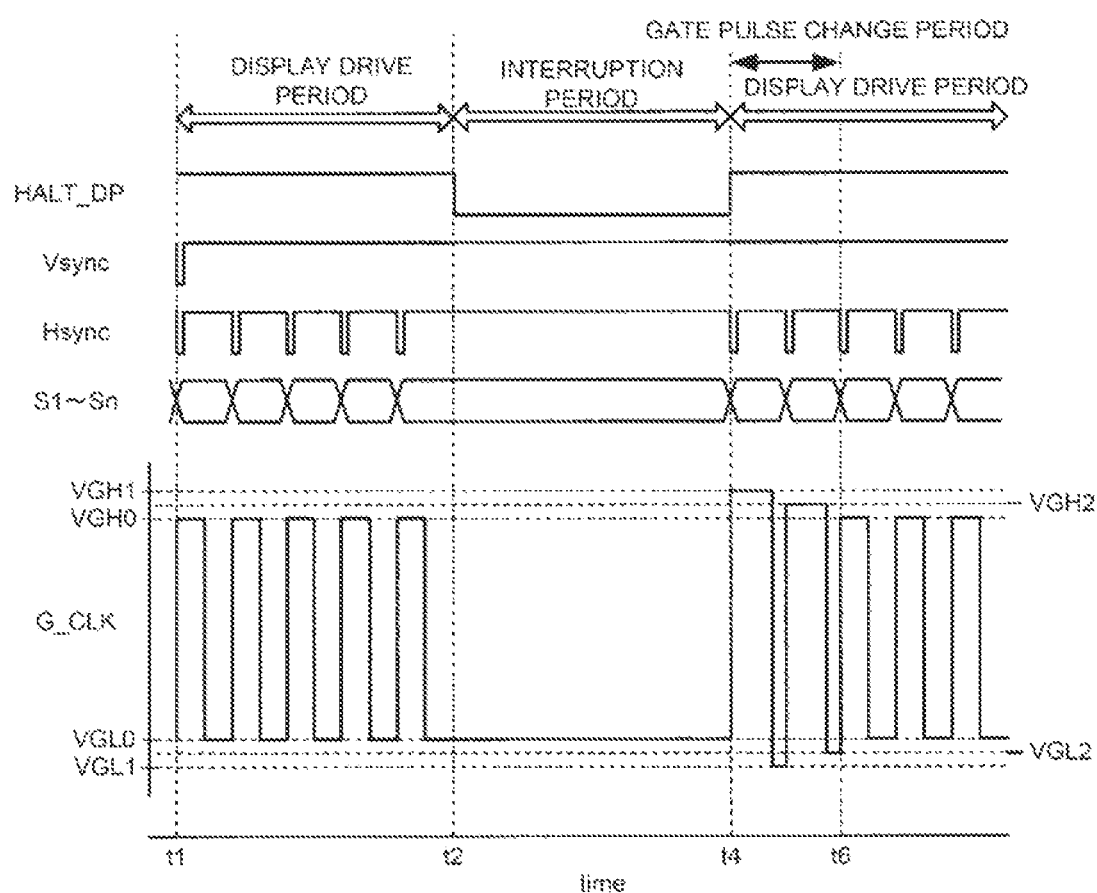
FIG. 11 is a timing diagram illustrating an operation example of the gate control driver.

FIG. 11 is a timing diagram illustrating an operation example of the gate control driver 25 as shown in FIG. 10.

In an initial display drive period between time t1 and time t2, the clock G_CLK is output at a normal amplitude in a range between VGL0 and VGH0. In case that the clock enters the interruption period at time t2, the output thereof is stopped. Thereafter, in case that the next display drive period is started from time t4, in a gate pulse change period from time t4 to time t6, the clock G_CLK is output with the extension of a high period by the pulse width adjustment circuit 33 thereby changing the duty cycle of clock G_CLK. In the first-half period of the gate pulse change period from time t4 to time t6, the amplitude of the clock G_CLK is further changed from the normal amplitude in a range between VGL0 and VGH0 to the extended amplitude between VGL1 and VGH1, and is changed to the amplitude between VGL2 and VGH2 having an extension width smaller than that in the second-half period thereof. After time t6, the clock returns to a normal output similarly to the initial display drive period between time t1 and time t2. The gate pulse change period (time t4 to time t6) in which the high period is extended and the amplitude is extended can be set by, for example, a register. The operation example shown in this drawing is different from that shown in FIG. 6, in that not only the high period and the amplitude are extended in the gate pulse change period, but also the extension of the amplitude is changed halfway. In addition thereto, as described with reference to FIGS. 7 to 9, it is also possible to change the setting of the gate pulse change period. Thereby, the degree of freedom of the amplitude capable of being selected is further extended.

As described above, while the invention has been described specifically based on the embodiments thereof, the invention is not limited to the embodiments, and it goes without saying that various changes and modifications may be made without departing from the scope of the invention.

For example, a case has been described in which the display driver with a built-in touch panel controller (composite IC) 1 is mainly connected to a liquid crystal display panel, but the display driver can be changed to a composite IC 1 for driving an OLED. In addition, in the detailed configuration example of the composite IC 1 shown in FIG. 1, a configuration example in which the frame memory 24 is built in is shown, but an appropriate change can be made not only in a simple configuration in which the frame memory is not included, but also in a highly-functional configuration further including other functions.

What is claimed is:

1. A display drive circuit connected to a display panel including a plurality of source electrodes, a plurality of gate electrodes, a plurality of display cells disposed at intersecting portions of the pluralities of source electrodes and gate electrodes, and a gate drive circuit that scans the plurality of gate electrodes, the display drive circuit comprising:
    a source driver configured to drive the plurality of source electrodes; and
    a gate control driver configured to supply a clock signal to the gate drive circuit,
    wherein the source driver is configured to drive the plurality of source electrodes during a display drive period and stop updating the display panel using the plurality of source electrodes during an interruption period, wherein the display drive period and the interruption period are alternately performed,
    wherein the gate control driver is configured to output a gate pulse change period, wherein during the gate pulse change period a pulse width of the clock signal is extended during a start of the display drive period after the interruption period relative to the pulse width of the clock signal during a later portion of the display drive period, and
    wherein each of the plurality of display cells comprises a transfer gate transistor comprising a gate terminal connected to a corresponding gate electrode of the plurality of gate electrodes and a source terminal connected to a corresponding source electrode of the plurality of source electrodes.

2. The display drive circuit according to claim 1, wherein extending the pulse width of the clock signal during the gate pulse change period compensates for a voltage drop due to leakage that occurs during the interruption period.

3. The display drive circuit according to claim 1, wherein the gate control driver extends an amplitude of the clock signal which is output in the gate pulse change period.

4. The display drive circuit according to claim 3, further comprising a first register,
    wherein the gate control driver is configured to set a length of the gate pulse change period relative to when the interruption period is terminated based on a parameter stored by the first register.

5. The display drive circuit according to claim 3, further comprising a third register,
    wherein the gate control driver is configured to change one or both of the pulse width and the amplitude of the clock signal which is outputted in the gate pulse change period based on a parameter stored in the third register.

6. The display drive circuit according to claim 5, further comprising a fourth register,
    wherein the gate control driver is configured to:
        change one or both of the pulse width and the amplitude of the clock signal to be outputted based on the parameter which is set in the third register in a first portion of the gate pulse change period, and
        change one or both of the pulse width and the amplitude of the clock signal to be outputted based on a parameter stored in the fourth register in a remaining portion of the gate pulse change period.

7. A display drive circuit connected to a display panel including a plurality of source electrodes, a plurality of gate electrodes, a plurality of display cells disposed at intersecting portions of the pluralities of source electrodes and gate electrodes, and a gate drive circuit that scans the plurality of gate electrodes, the display drive circuit comprising:
    a source driver configured to drive the plurality of source electrodes; and
    a gate control driver configured to supply a clock signal to the gate drive circuit,
    wherein the source driver is configured to drive the plurality of source electrodes during a display drive period and stop updating the display panel using the plurality of source electrodes during an interruption period, wherein the display drive period and the interruption period are alternately performed,
    wherein the gate control driver is configured to output the clock signal before the interruption period is terminated during a gate pulse change period, wherein the gate pulse change period extends at least until the display drive period subsequent to the interruption period is started, and
    wherein each of the plurality of display cells comprises a transfer gate transistor comprising a gate terminal connected to a corresponding gate electrode of the plurality of gate electrodes and a source terminal connected to a corresponding source electrode of the plurality of source electrodes.

8. The display drive circuit according to claim 7, wherein the gate control driver is configured to extend an amplitude of the clock signal which is outputted during the gate pulse change period.

9. The display drive circuit according to claim 8, further comprising a third register,
    wherein the gate control driver is configured to change the amplitude of the clock signal to be outputted in the gate pulse change period based on a parameter stored in the third register.

10. The display drive circuit according to claim 9, further comprising a fourth register,
    wherein the gate control driver is configured to:
        change the amplitude of the clock signal to be outputted based on the parameter in the third register in a first portion of the gate pulse change period, and
        change the amplitude of the clock signal to be outputted based on a parameter stored in the fourth register in a remaining portion of the gate pulse change period.

11. The display drive circuit according to claim 8, wherein the gate control driver is configured to:
    set a duration of the gate pulse change period to include a portion of the interruption period and a portion of the display drive period, and
    extend the amplitude of the clock signal to be outputted in the gate pulse change period relative to the amplitude of the clock signal in a subsequent portion of the display drive period.

12. The display drive circuit according to claim 11, further comprising a first register and a second register, wherein the gate control driver is configured to operate a plurality of periods, wherein lengths of the plurality of periods are set based on parameters stored in the first register and the second register, respectively, wherein the gate pulse change period comprises the plurality of periods, wherein the parameter in the first register specifies a period from a time at which the interruption period is terminated until the gate pulse change period is terminated, and wherein the parameter in the second register specifies a period from when the gate pulse change period is started and when the interruption period is terminated.

13. The display drive circuit according to claim 11, wherein touch detection is performed during the interruption period and no touch detection is performed during the display drive period.

14. The display drive circuit according to claim 11, wherein the gate control driver is configured to increase an amplitude of the clock signal during a later portion of the gate pulse change period relative to the amplitude of the clock signal during an earlier portion of the gate pulse change period.

15. A display drive circuit connected to a display panel including a plurality of source electrodes, a plurality of gate electrodes, a plurality of display cells disposed at intersecting portions of the pluralities of source electrodes and gate electrodes, and a gate drive circuit that scans the plurality of gate electrodes, the display drive circuit comprising:
- a source driver configured to drive the plurality of source electrodes; and
- a gate control driver configured to supply a clock signal to the gate drive circuit, wherein the source driver is configured to drive the plurality of source electrodes during a display drive period and stop updating the display panel using the plurality of source electrodes during an interruption period when touch detection is performed, wherein the display drive period and the interruption period are sequential time periods, wherein the gate control driver is configured to increase a pulse width of the clock signal during a start of the display drive period relative to the pulse width of the clock signal during a later portion of the display drive period, and wherein each of the plurality of display cells comprises a transfer gate transistor comprising a gate terminal connected to a corresponding gate electrode of the plurality of gate electrodes and a source terminal connected to a corresponding source electrode of the plurality of source electrodes.

16. The display drive circuit according to claim 15, wherein the source driver is configured to drive the plurality of source electrodes during a plurality of display drive periods used to update the display panel based on a single display frame, wherein a respective interruption period is between each of the display drive periods.

17. The display drive circuit according to claim 15, wherein increasing the pulse width of the clock signal comprises changing a duty cycle of the clock signal.

18. The display drive circuit according to claim 15, wherein the gate control driver is configured to increase an amplitude of the clock signal during the start of the display drive period relative to the amplitude of the clock signal during the later portion of the display drive period.

19. The display drive circuit according to claim 18, wherein the gate control driver is configured to:
- increase the amplitude of the clock signal to a first amplitude during a first period of the display drive period,
- decrease the amplitude of the clock signal to a second amplitude during a second period of the display drive period subsequent to the first period, and
- decrease the amplitude of the clock signal to a third amplitude during a third period of the display driver period subsequent to the second period.

20. The display drive circuit according to claim 19, wherein the first period of the display drive period occurs at the start of the display drive period and after a termination of the interruption period.

* * * * *